J. HARRIS.
Broom Head.

No. 54,338.

Patented May 1, 1866.

WITNESSES:

INVENTOR.

UNITED STATES PATENT OFFICE.

JOHN HARRIS, OF MARQUETTE, WISCONSIN.

BROOM-HEAD.

Specification forming part of Letters Patent No. 54,338, dated May 1, 1866.

*To all whom it may concern:*

Be it known that I, J. HARRIS, of Marquette, in the county of Green Lake and State of Wisconsin, have invented a new and Improved Broom and Brush Frame; and I do hereby declare that the following is a full, clear, and exact description thereof, which will enable others skilled in the art to make and use the same, reference being had to the accompanying drawings, forming part of this specification, in which—

Figure 1:
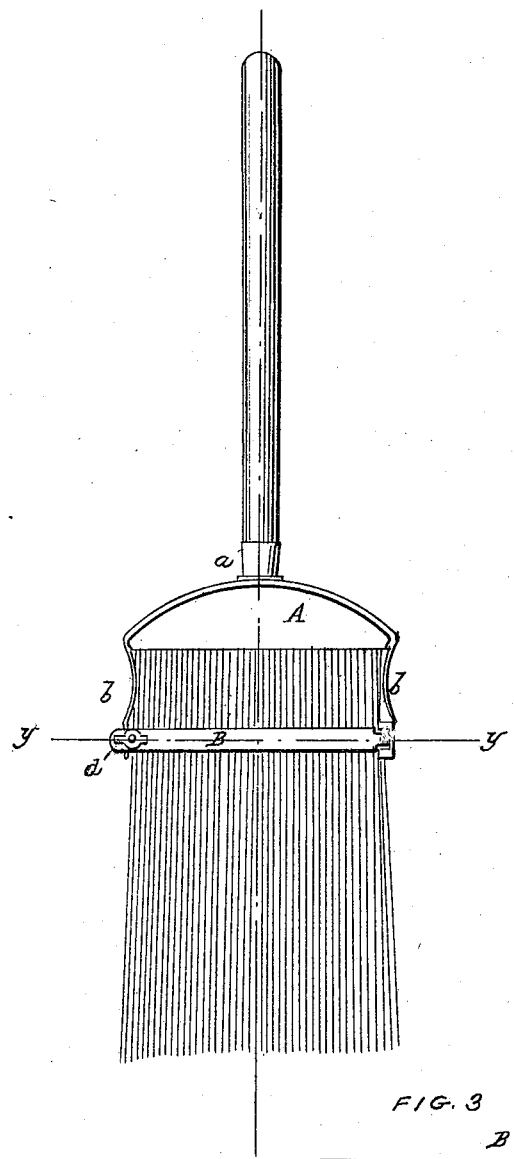
Figure 2:
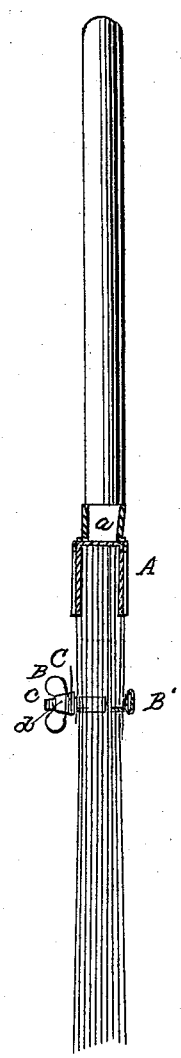
Figure 3:
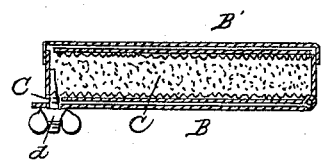

Figure 1 is a side elevation of the frame, showing its application to a broom. Fig. 2 is a vertical longitudinal central section taken in the line $x\ x$, Fig. 1. Fig. 3 is a transverse section taken in the line $y\ y$, Fig. 1.

Similar letters of reference indicate like parts.

My invention consists in the employment or use, in connection with a socket for receiving the ends of the broom-corn, bristles, &c., of a frame for encompassing the same, having one side so constructed that it can be raised up to permit new wisps or hairs to be inserted in the frame and again shut down and screwed tightly, so as to hold the wisps secure enough to keep them from falling out, and also in attaching serrated plates or strips on the inside of the frame, whereby a better griping or compressing together of the wisps or hair is obtained.

The drawings represent my invention applied to a broom, and I will therefore describe it as being so applied, desiring it to be understood that I intend to insert hair, bristles, &c., in the same way that I do broom-corn.

A represents the socket for receiving the ends of the wisps of broom-corn. On its upper side it carries a socket, $a$, into which the handle of the broom is to be inserted and secured in any suitable way.

A projecting piece or plate, $b$, is attached to each end of the socket and carried down to about the distance where, in ordinary brooms, the rows of sewing are placed. To these projecting pieces there are secured two strips, B B', so that one will be on each side of the whisks when the broom-corn has been inserted in the frame. The strip B is hinged at one end, so as to be capable of being raised up, like a jaw, to afford a good chance for inserting the broom-corn; and in order to secure it down so as to clasp the wisps, a screw-pin, $c$, is secured to one of the plates $b$, which protrudes through a hole made in the strip B for this purpose. When the jaw B is closed down all the parts will be firm and rigid.

On the inside of each of the strips B B' there is secured a serrated plate or strip, C, the teeth being toward the broom-corn, as will be seen by reference to Fig. 3. These assist greatly in holding the wisps in place, so that they shall not "bunch," so to speak, and this often happens where hair or bristles are used. A frame thus constructed is rigid in every respect, and offers great facility for replacing worn-out wisps, and it is also light and not at all unwieldy; hence it recommends itself to all persons having facilities for making their brooms and brushes.

Having thus described my invention, what I claim as new, and desire to secure by Letters Patent, is—

The combination of the crescent-shaped socket A, projecting handle-socket $a$, arms $b\ b$, serrated bars C C, clamp-jaws B B', screw $c$, and nut $d$, all constructed, arranged, and employed as and for the purposes specified.

JOHN HARRIS.

Witnesses:
LUCIUS CAS. VINO,
A. R. SPENCER.